United States Patent
Chen

(10) Patent No.: US 12,392,189 B2
(45) Date of Patent: Aug. 19, 2025

(54) ELECTRIC DOOR DRIVING MECHANISM FOR MACHINE TOOL

(71) Applicant: SHIN I TAI CORP., Taichung (TW)

(72) Inventor: Chen-Chuan Chen, Taichung (TW)

(73) Assignee: SHIN I TAI CORP., Taichung (TW)

( * ) Notice: Subject to any disclaimer, the term of this patent is extended or adjusted under 35 U.S.C. 154(b) by 0 days.

(21) Appl. No.: 18/583,134

(22) Filed: Feb. 21, 2024

(65) Prior Publication Data
US 2024/0295141 A1 Sep. 5, 2024

(30) Foreign Application Priority Data
Mar. 2, 2023 (TW) ................................. 112201819

(51) Int. Cl.
| | | |
|---|---|---|
| *E05F 15/60* | (2015.01) | |
| *E05D 15/06* | (2006.01) | |
| *E05F 5/00* | (2017.01) | |

(52) U.S. Cl.
CPC ............ *E05F 15/60* (2015.01); *E05D 15/063* (2013.01); *E05D 15/0647* (2013.01);
(Continued)

(58) Field of Classification Search
CPC ........ E05F 15/60; E05F 5/003; E05D 15/063; E05D 15/0647; E05D 15/0652; E05Y 2201/10; E05Y 2600/62; E05Y 2999/00; E05Y 2201/212; E05Y 2201/64; E05Y 2201/688; E05Y 2800/12; E05Y 2201/668; E05Y 2201/684; F16P 3/001; E06B 9/68
(Continued)

(56) References Cited

U.S. PATENT DOCUMENTS 3,628,289 A * 12/1971 Buffington ............ F25D 23/021
49/504
3,810,330 A * 5/1974 Daggy .................... E05D 15/58
49/404
(Continued)

FOREIGN PATENT DOCUMENTS

| CN | 102733708 A | * | 10/2012 | .............. E05F 15/60 |
| CN | 116044277 A | * | 5/2023 | |

(Continued)

*Primary Examiner* — David E Sosnowski
(74) *Attorney, Agent, or Firm* — Birch, Stewart, Kolasch & Birch, LLP

(57) ABSTRACT

An electric door driving mechanism includes a base mount having an accommodation groove, a sliding groove below the accommodation groove and a bottom opening communicated with the sliding groove, a slide slidably moveable in the sliding groove, a door panel mounting member moveable along with the slide, a linear motor having a stator disposed in the accommodation groove, and a mover fixed on the slide and drivenable by the stator to move, and front and rear water-resistant pieces fixed to the base mount and partially abutted with each other to close the bottom opening while a body portion of the door panel mounting member passes between the front and rear water-resistant pieces and has front and rear sides abutted against the front and rear water-resistant pieces, respectively, thereby preventing foreign objects and liquid from entering the inside of the electric driving mechanism via the bottom opening.

12 Claims, 8 Drawing Sheets

(52) U.S. Cl.
CPC ........... *E05F 5/003* (2013.01); *E05Y 2201/10* (2013.01); *E05Y 2600/62* (2013.01); *E05Y 2999/00* (2024.05)

(58) Field of Classification Search
USPC ............. 49/360, 425, 409, 412; 16/91, 94 R, 16/97 R, 106, 107
See application file for complete search history.

(56) References Cited

U.S. PATENT DOCUMENTS

| | | | | |
|---|---|---|---|---|
| 4,073,092 A * | 2/1978 | Williams | ............ | E05D 15/0613 160/199 |
| 4,643,239 A * | 2/1987 | Wentzel | ................. | B60J 5/125 160/209 |
| 4,690,862 A * | 9/1987 | Hoffmann | ............... | B29C 44/22 264/173.17 |
| 4,957,301 A * | 9/1990 | Clay, Jr. | .................... | B60J 5/14 277/572 |
| 7,578,096 B2 * | 8/2009 | Haab | ................. | E05F 15/638 74/89.17 |
| 7,592,720 B2 * | 9/2009 | Busch | ................. | H02K 41/031 310/12.04 |
| 7,748,431 B2 * | 7/2010 | Jansen | ..................... | E06B 9/13 160/264 |
| 8,474,185 B2 * | 7/2013 | Busch | ..................... | E05F 15/60 49/358 |
| 8,881,464 B1 * | 11/2014 | Huckeba | ............... | E06B 1/6046 49/489.1 |
| 11,021,900 B2 * | 6/2021 | Lam | .................... | E05D 15/0652 |
| 11,486,182 B2 * | 11/2022 | Xu | .......................... | H02K 16/04 |
| 2001/0011439 A1 * | 8/2001 | Maki | ..................... | E05D 15/063 49/360 |
| 2004/0065019 A1 * | 4/2004 | Haab | ......................... | E06B 3/02 49/409 |
| 2010/0139172 A1 * | 6/2010 | Busch | .................... | H02K 41/02 310/12.02 |
| 2010/0242365 A1 * | 9/2010 | Langner | .............. | E05D 15/0686 49/404 |
| 2015/0368953 A1 * | 12/2015 | Willach | .............. | E05D 15/0652 49/409 |
| 2024/0295141 A1 * | 9/2024 | Chen | ........................ | E05F 15/60 |

FOREIGN PATENT DOCUMENTS

| | | | | |
|---|---|---|---|---|
| CN | 117605384 A | * | 2/2024 | |
| DE | 202011001533 U1 | * | 4/2011 | ............. E05F 15/60 |
| KR | 101884785 B1 | * | 8/2018 | |
| KR | 101891538 B1 | * | 8/2018 | |
| WO | WO-0174409 A1 | * | 10/2001 | ............... A61L 2/26 |
| WO | WO-2019148858 A1 | * | 8/2019 | ......... E05D 15/0626 |

* cited by examiner

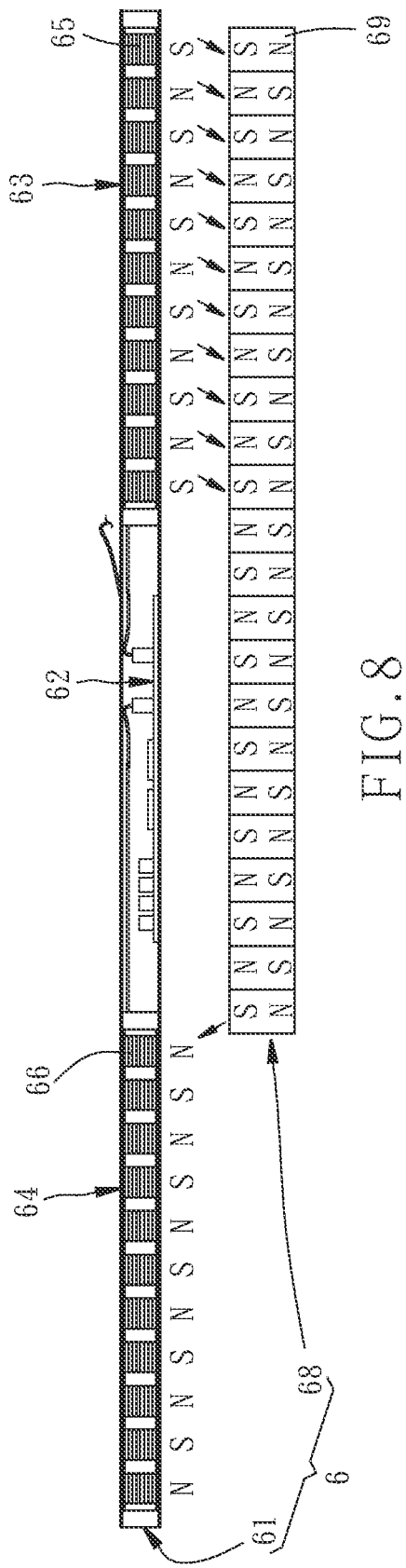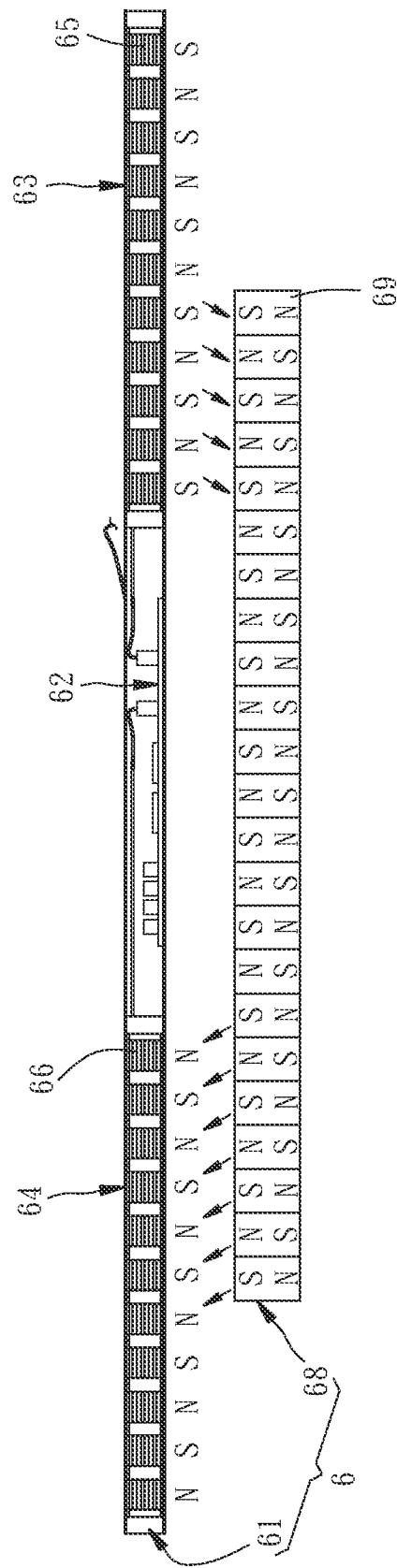

ELECTRIC DOOR DRIVING MECHANISM FOR MACHINE TOOL

BACKGROUND OF THE INVENTION

1. Field of the Invention

The present invention relates generally to electric doors and more particularly, to an electric door driving mechanism for a machine tool.

2. Description of the Related Art

In the processing task of a conventional machine tool, the operators must manually close the sliding door of the machine tool to prevent machining chips and cutting fluid from splashing outside the machine tool. With the rapid advancement of automation technology, machine tools are often cooperated with robotic arms to perform heavy and dangerous loading and unloading tasks. Therefore, machine tools are typically equipped with automatically operated electric doors to facilitate performance of the loading and unloading tasks by robotic arms and to block the aforementioned machining chips and cutting fluid.

Normally, the conventional electric door driving mechanism uses a motor to drive a reduction device to control the opening and closing of the electric door. During machining operations, since the conventional electric door driving mechanism may not have a basic splash protection design, the cutting chips sprayed out during the machining process are easy to get stuck in the bottom opening for the electric door to move, and the cutting fluid splashed around during the machining process may easily penetrate through the bottom opening to cause rusting of the internal mechanical parts. As a result, for an electric door after a long term use, large abnormal noises and vibrations may occur, resulting in decrease in the service life of the electric door driving mechanism. Furthermore, the conventional electric door driving mechanism is relatively complex in structural design. To perform inspection or maintenance of internal components, the disassembly and assembly tasks of the conventional electric door driving mechanism are relatively complicated. This is not conducive to on-site repair and maintenance operations, resulting in time-consuming dismantling and assembling tasks for operators and low working efficiency. Therefore, the conventional electric door driving mechanism no longer meets the requirements of the industry and thus needs to be improved.

SUMMARY OF THE INVENTION

The present invention has been accomplished in view of the above-noted circumstances. It is an objective of the present invention to provide an electric door driving mechanism for machine tools, which can prevent foreign objects and cutting liquid from splashing into inside of the electric door driving mechanism.

Another objective of the present invention is to provide an electric door driving mechanism for machine tools, which has a simple structure and is easy and convenient to assemble, thereby solving the problem of complicated disassembly and assembly procedures of the conventional electric door driving mechanism.

To attain the above objectives, the present invention provides an electric door driving mechanism for a machine tool comprises a track unit, a sliding unit, a linear motor, a front water-resistant piece, and a rear water-resistant piece.

The track unit comprises a base mount, a left end cap, and a right end cap. The base mount has an accommodation groove extending along a longitudinal axis of the base mount, a sliding groove located below the accommodation groove, a bottom opening in communication with the sliding groove, and left and right openings in communication with the accommodation groove, the sliding groove, and the bottom opening. The left and right end caps close the left and right openings, respectively. The sliding unit comprises a slide and a door panel mounting member. The slide is disposed in the sliding groove in a way that the slide is movable along the longitudinal axis of the base mount. The door panel mounting member is fixed to the slide, such that the door panel mounting member is moveable along with the slide. The door panel mounting member has a body portion, which downwardly extends through the bottom opening and is partially exposed outside the base mount. The linear motor comprises a stator disposed in the accommodation groove and arranged along the longitudinal axis, and a mover disposed on the slide, facing the stator, and arranged along the longitudinal axis. The mover is driven by the stator to drive the slide to slidably move in the sliding groove. The front and rear water-resistant pieces are respectively fixed to the base mount along the longitudinal axis in a way that the front and rear water-resistant pieces are partially abutted with each other to close the bottom opening while the body portion of the door panel mounting member passes between the front and rear water-resistant pieces in a way that the body portion of the door panel mounting member has front and rear sides, which are abutted against the front and rear water-resistant pieces, respectively.

As a result, the electric door driving mechanism of the present invention uses the mover of the linear motor to be driven by the stator to drive the slide and the door panel mounting member to slide in the sliding groove, so that the door panel mounting member may drive a door panel, which is fixed to the door panel mounting member, to synchronously move, thereby achieving the effect of automatic opening and closing of the door panel. In addition, during the sliding movement of the door panel mounting member, the electric door driving mechanism of the present invention further utilizes the front and rear water-resistant pieces to abut against each other to close the bottom opening, thereby preventing the foreign objects and cutting liquid from splashing into the inside of the electric door driving mechanism through the bottom opening.

Preferably, the base mount comprises a front bottom plate and a rear bottom plate, which extend along the longitudinal axis in a way that the bottom opening is formed between the front and rear bottom plates. The front water-resistant piece and the rear water-resistant piece are respectively fixed to the front bottom plate and the rear bottom plate, respectively. As such, the effect of closing the bottom opening may be effectively and positively achieved.

Preferably, the front bottom plate may have a first elongated slot extending along the longitudinal axis, and the rear bottom plate may have a second elongated slot extending along the longitudinal axis. The first and second elongated slots each may have a side opening. The front and rear water-resistant pieces are respectively fixed to the first and second elongated slots in a way that the front and rear water-resistant pieces partially extend through the side openings to abut against each other to close the bottom opening. As such, the effect of closing the bottom opening may be effectively and positively achieved.

Preferably, the first and second elongated slots each may have an inner groove portion and an outer groove portion in communication with the inner groove portion and the side opening. The front and rear water-resistant pieces each may have a head portion, a neck portion connecting the head portion, and a body portion connecting the neck portion. The head portions of the front and rear water-resistant pieces are respectively positioned in the inner groove portions, the neck portions of the front and rear water-resistant pieces are respectively positioned in the outer groove portions, and the body portions of the front and rear water-resistant pieces extend over the bottom opening and abut against each other to close the bottom opening. As such, the front and rear water-resistant pieces may be firmly mounted to the base mount, and the effect of closing the bottom opening may be effectively and positively achieved.

Preferably, the front and rear water-resistant pieces each may have upper and lower recess portions formed between the head portion and the neck portion, and corresponding to each other. The first and second elongated slots each may have upper and lower protrusion portions formed between the outer groove portion and the inner groove portion, corresponding to each other, extending along the longitudinal axis, and respectively engaged in the upper and lower recess portions of one of the front and rear water-resistant pieces. As a result, the front and rear water-resistant pieces may be firmly and positively mounted to the base mount without escape from the base mount.

Preferably, the body portion of each of the front and rear water-resistant pieces may have an extension segment extending inclinedly and upwardly, a bending portion connecting the extension segment, and an abutment segment connecting the bending portion, extending downwardly relative to the extension segment, and abutting against one of the front and rear sides of the body portion of the door panel mounting member. as such, the sealing effect for the front and rear water-resistant pieces that abut against the door panel mounting member may be enhanced.

Preferably, the outer groove portion of each of the first and second elongated slots may have a tapered shape gradually expanding from a juncture between the outer and inner groove portions toward the side opening; the neck portion of each of the front and rear water-resistant pieces may have a tapered shape complementary with the tapered shape of the outer groove portion. As such, the cutting liquid penetrated into the first and second elongated slots may be blocked, thereby enhancing the sealing effect between the front and rear water-resistant pieces and he first and second elongated slots.

Preferably, the door panel mounting member may further comprise a base board connected with the body portion of the door panel mounting member. The door panel mounting member is inserted into the sliding groove from the left opening or the right opening of the base mount and is fixedly mounted to a bottom portion of the slide from bottom to top by the base board. The assembling and dismantling tacks may be conveniently performed during repairment and maintenance.

Preferably, the slide may comprise a mover accommodating mount and a bottom mount below the mover accommodating mount. The mover of the linear motor is installed on a top portion of the mover accommodating mount. The mover accommodating mount has an adjustment groove extending along the longitudinal axis, an adjustment block slidably disposed in the adjustment groove, and a bottom opening in communication with the adjustment groove. The door panel mounting member is fixed to the adjustment block by a bolt passing through the bottom mount and the bottom opening of the mover accommodating mount and screwing into the adjustment block such that the adjustment block is positioned in the adjustment groove. The bottom mount has a front side provided with a pulley, and the sliding groove has a front side provided with a protruding rail coupled with the pulley. As such, by means of adjusting the position of the adjustment block, the present invention may be conveniently used with various door panel having different widths, and the adjustment block may be conveniently positioned in the adjustment groove.

Preferably, the front side of the bottom mount may be provided with a first pulley, a second pulley adjacent to the first pulley, and a third pulley adjacent to the second pulley. The bottom mount has a rear side provided with a first roller, a second roller adjacent to the first roller, and a third roller adjacent to the second roller. The base mount may have a front partition plate and a rear partition plate located between the accommodation groove and the sliding groove, extending along the longitudinal axis, and spaced from each other. The sliding groove has a rear side provided with a slide rail opposite to the protruding rail. The second pulley abuts against the front partition plate, while the first and third pulleys abut against the protruding rail. The second roller abuts against the rear partition plate, while the first and third rollers abut against the slide rail. By means of the unique butting arrangement among pulleys and rollers, the slide may not be easily vibrated up and down during sliding movement in the sliding groove.

Preferably, the track unit may comprise a left stator stopper and a right stator stopper, which are respectively inserted into the accommodation groove from the left opening or the right opening of the base mount and fixed to an inner wall surface of a top plate of the base mount by a bolt from bottom to top, such that the left stator stopper and the right stator stopper are positioned at left and right sides of the stator to limit a fixed position of the stator. As a result, the assembling and dismantling tacks for the stator may be conveniently performed for repairment and maintenance.

Preferably, the track unit may comprise a left slide stopper and a right slide stopper, which are respectively inserted into the sliding groove from the left opening or the right opening of the base mount and fixed to the sliding groove to limit movement of the slide in the sliding groove. As a result, the sliding stroke of the mover in the sliding groove may be conveniently set and adjusted.

Preferably, the base mount may comprise a front partition plate and a rear partition plate, which are located between the accommodation groove and the sliding groove, extend along the longitudinal axis, and spaced from each other. The left and right slide stoppers each have a lower mounting plate and an upper mounting plate slidably positioned on top surfaces of the front and rear partition plates. Each of the lower mounting plates has a horizontal plate portion and a vertical plate portion connected with the horizontal plate portion. Each of the horizontal plate portions is slidably positioned on bottom surfaces of the front and rear partition plates and fixed with one of the upper mounting plates by a bolt, such that the left and right slide stoppers are fixedly positioned in the siding groove. Each of the vertical plate portions has a buffer pad facing the slide for providing a buffering effect when the slide is stopped by one of the left and right slide stoppers during reciprocal sliding movement.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein:

FIG. 8 is a schematic view illustrating the movement of the electric door driving mechanism of the embodiment of the present invention, showing a repulsive force generated between magnetic attractive members and electromagnetic coils;

FIG. 9 is still a schematic view illustrating the movement of the electric door driving mechanism of the embodiment of the present invention, showing an attractive force generated between the magnetic attractive members and the electromagnetic coils.

DETAILED DESCRIPTION OF THE INVENTION

Figure 1:
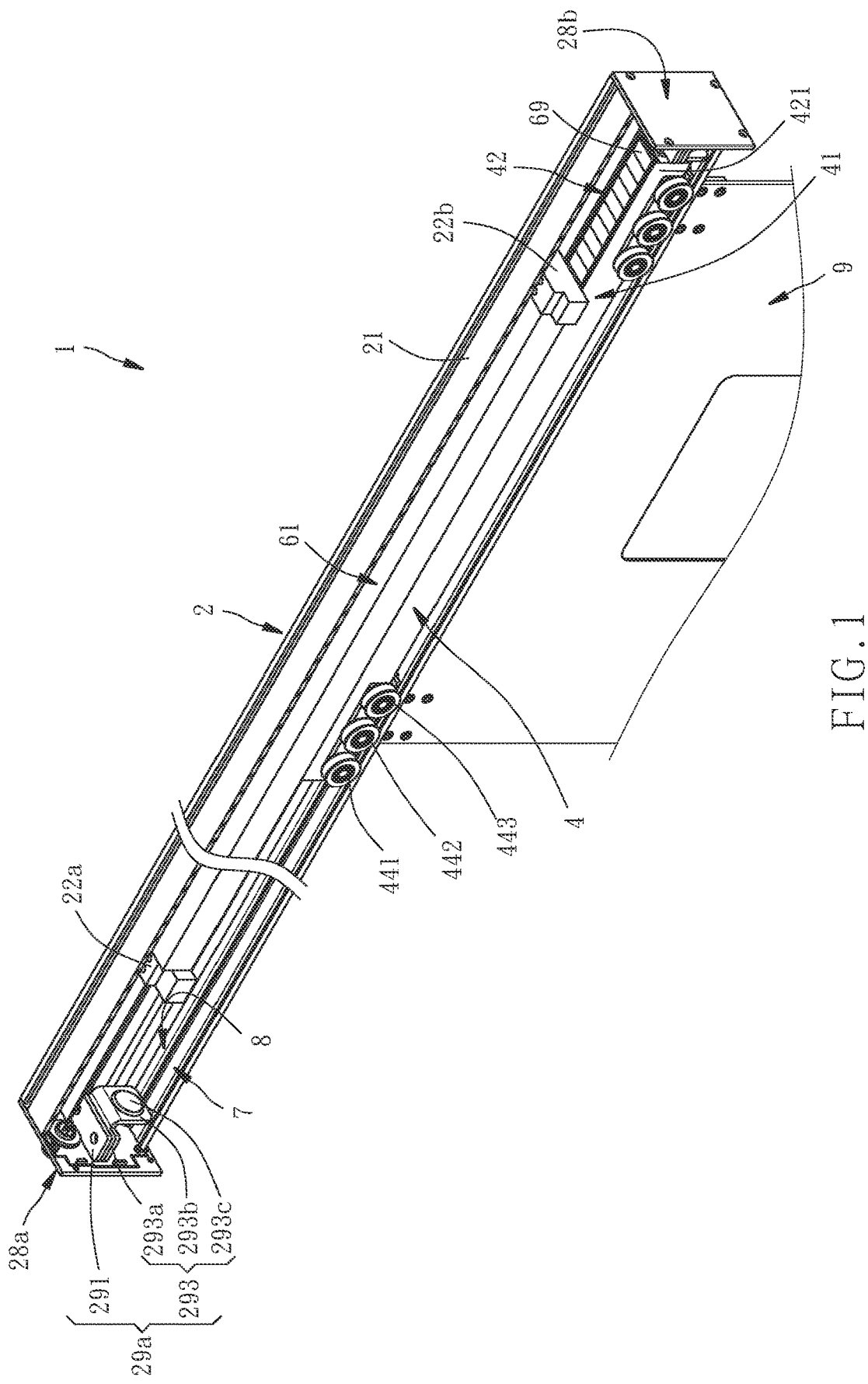
FIG. 1 is a perspective view of a part of an electric door driving mechanism according to an embodiment of the present invention, showing the inside of a track unit.

First of all, it is to be mentioned that in the entire specification, including the embodiments introduced below and the claims, the terms related to directionality are based on the direction in the drawings. Secondly, same or similar reference numerals used in the following embodiments and the appendix drawings designate same or similar elements or the structural features thereof throughout the specification for the purpose of concise illustration of the present invention.

Figure 2:
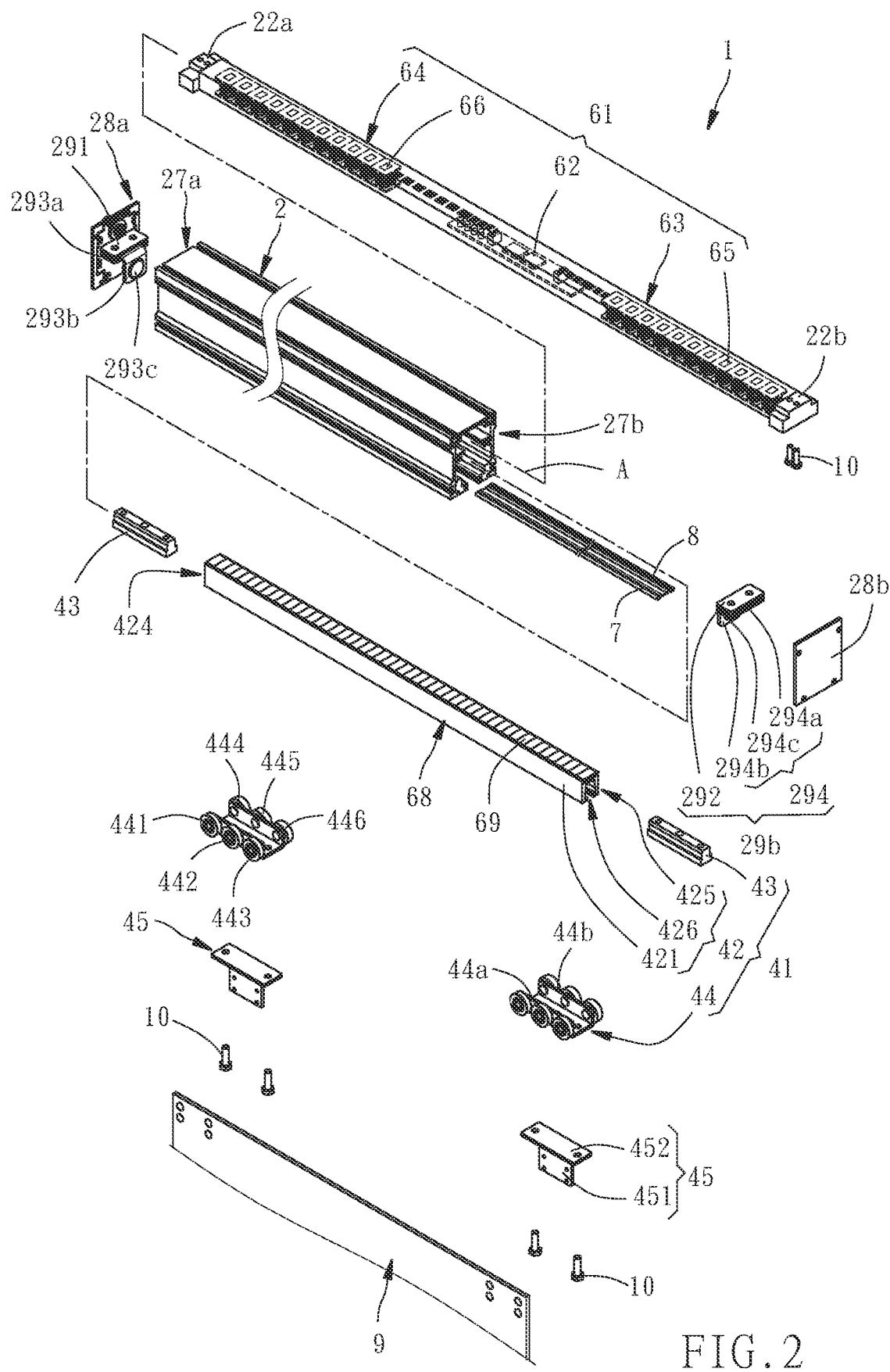
FIG. 2 is an exploded view of the electric door driving mechanism of the embodiment of the present invention.
Figure 3:
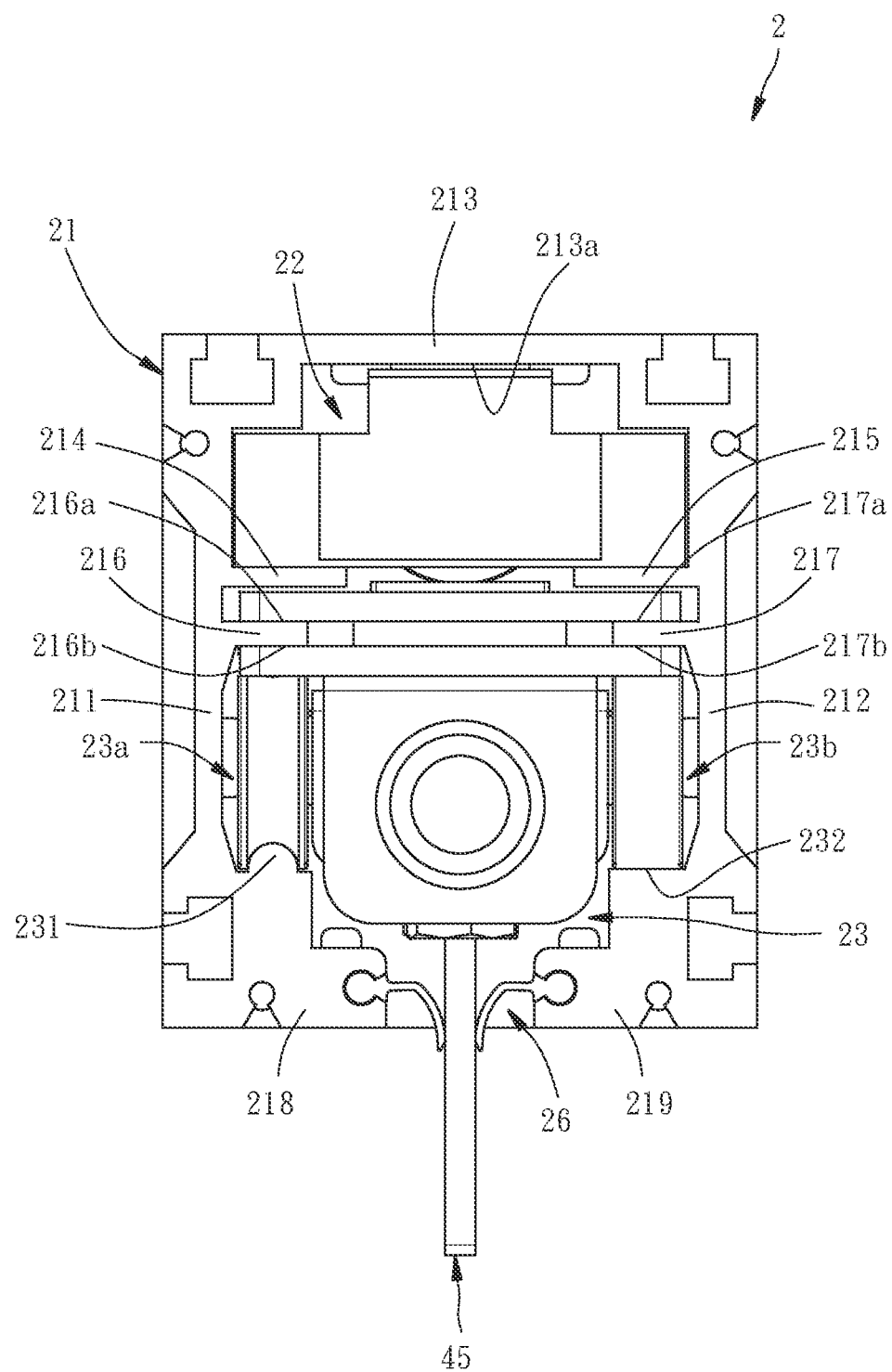
FIG. 3 is a left side view of the electric door driving mechanism of the embodiment of the present invention, in which the left end cap is omitted to show the inside of the base mount.

Referring to FIGS. 1 to 3, an electric door driving mechanism 1 provided by a preferred embodiment of the present invention is composed of a track unit 2, a sliding unit 4, a linear motor 6, a front water-resistant piece 7, and a rear water-resistant piece 8.

Figure 4:
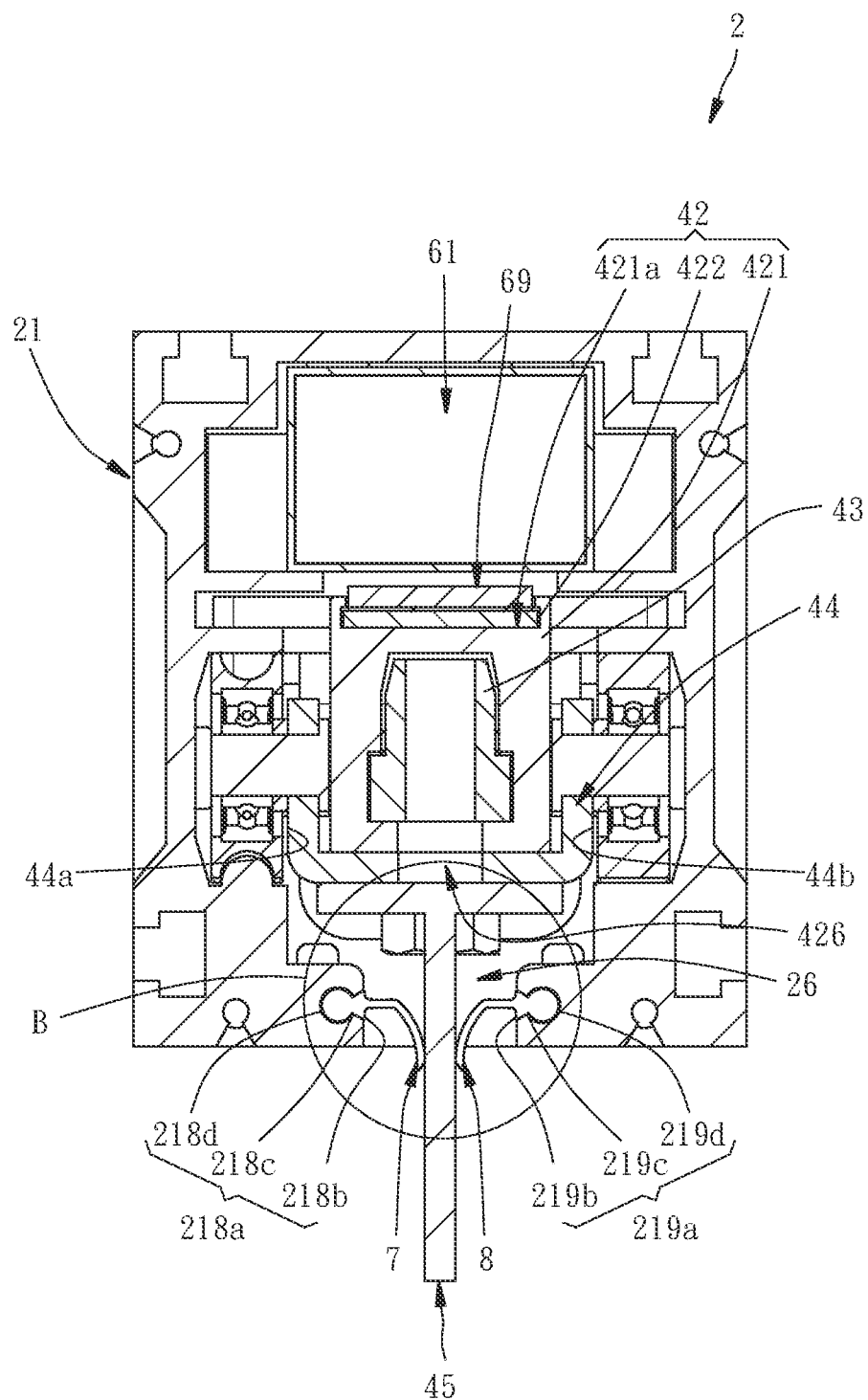
FIG. 4 is a lateral cross-sectional view of the electric door driving mechanism of the embodiment of the present invention.
Figure 5:
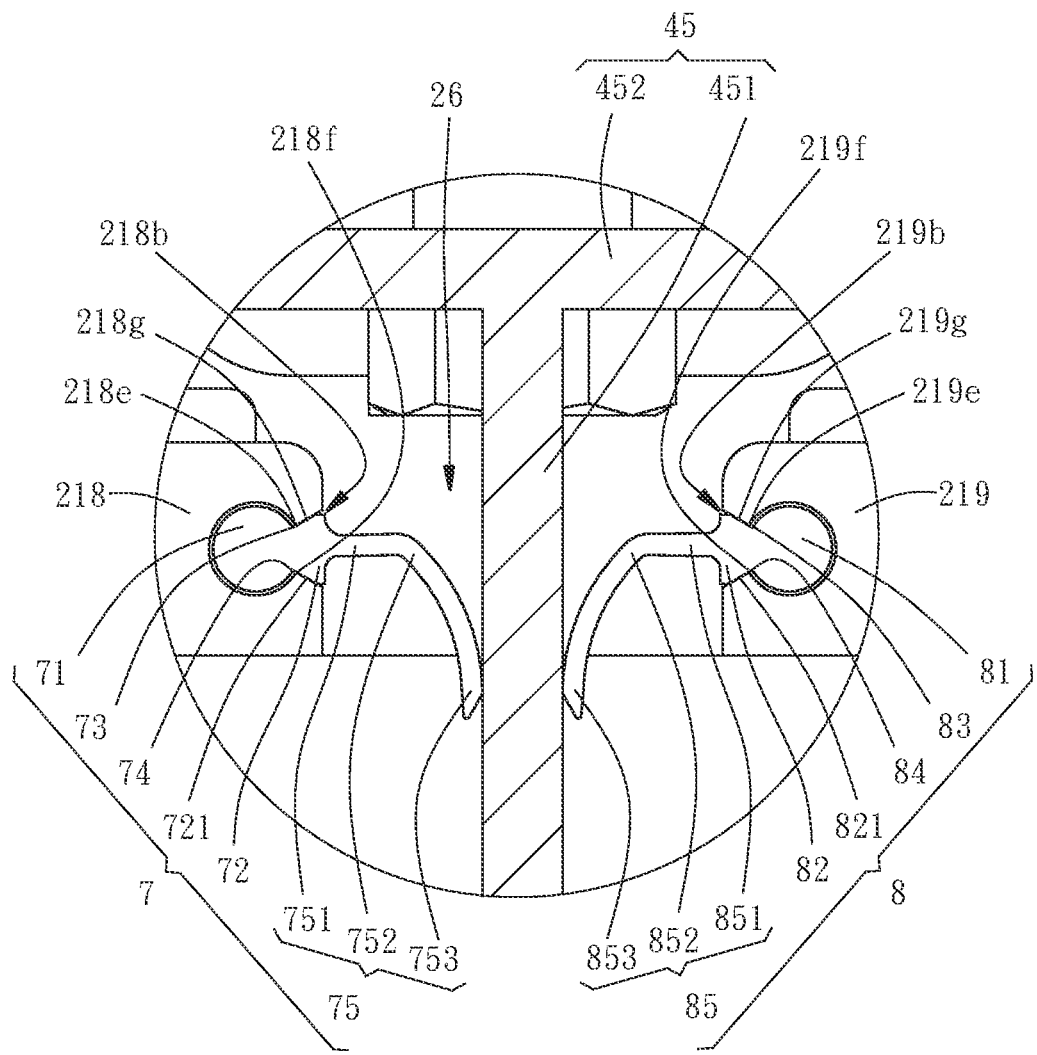
FIG. 5 is an enlarged view of the part B of FIG. 4, showing the relationship among the front and rear water-resistant pieces and the first and second elongated slots.

The track unit 2 comprises a base mount 21. The base mount 21 has a front side plate 211, a rear side plate 212, a top plate 213, a front support plate 214, a rear support plate 215, a front partition plate 216, a rear partition plate 217, a front bottom plate 218, and a rear bottom plate 219. The front and rear side plates 211, 212 extend along a longitudinal axis A. The top plate 213 is connected to the top edges of the front and rear side plates 211, 212. The front and rear support plates 214, 215 are respectively connected to the inner wall surfaces of the front and rear side plates 211, 212 and located below the top plate 213. The front and rear support plates 214, 215 extend along the longitudinal axis A and are spaced from each other at a predetermined distance in a way that an accommodation groove 22 extending along the longitudinal axis A is formed among the front and rear support plates 214, 215 and the top plate 213. The front and rear partition plates 216, 217 are respectively connected to the inner wall surfaces of the front and rear side plates 211, 212 and located below the front and rear support plates 214, 215 in a way that the front and rear partition plates 216, 217 extend along the longitudinal axis A and are spaced from each other at a predetermined distance. The front and rear bottom plates 218, 219 are connected to the bottom edges of the front and rear side plates 211, 212 and located below the front and rear partition plates 216, 217. The front and rear bottom plates 218, 219 extend along the longitudinal axis A and are spaced from each other at a predetermined distance in a way that in one hand, a sliding groove 23 is formed among the front and rear bottom plates 218, 219, the front and rear side plates 211, 212, and the front and rear partition plates 216, 217 and located below the accommodation groove 22, and in the other hand, a bottom opening 26 is formed between the front and rear bottom plates 218, 219 and communicated with the sliding groove 23. Further, the front side 23a of the sliding groove 23 has a protruding rail 231, and the rear side 23b of the sliding groove 23 has a slide rail 232 corresponding in location to the protruding rail 231. Furthermore, as shown in FIGS. 4 and 5, the front bottom plate 218 has a first elongated slot 218a extending along the longitudinal axis A, and the rear bottom plate 219 has a second elongated slot 219a extending along the longitudinal axis A. The first and second elongated slots 218a, 219a each have an inner groove portion 218d, 219d, a side opening 218b, 219b, and an outer groove portion 218c, 219c communicated with the inner groove portion 218d, 219d and the side opening 218b, 219b. The outer groove portions 218c, 219c each have a tapered wall surface 218g, 219g, i.e., having a tapered shape, respectively and gradually expending from the junctures between the inner groove portions 218d, 219d and the outer groove portions 218c, 219c towards the side openings 218b, 219b. Between the outer groove portions 218c, 219c and the inner groove portions 218d, 219d, there are corresponding upper protrusion portions 218e, 219e, and lower protrusion portions 218f, 219f extending along the longitudinal axis A.

Additionally, the base mount 21 is provided at left and right ends thereof with a left opening 27a and a right opening 27b, respectively. The left and right openings 27a, 27b are both communicated with the accommodation groove 22, the sliding groove 23, and the bottom opening 26. The track unit 2 further includes a left end cap 28a and a right end cap 28b, where the left end cap 28a closes the left opening 27a, and the right end cap 28b closes the right opening 27b.

Figure 6:
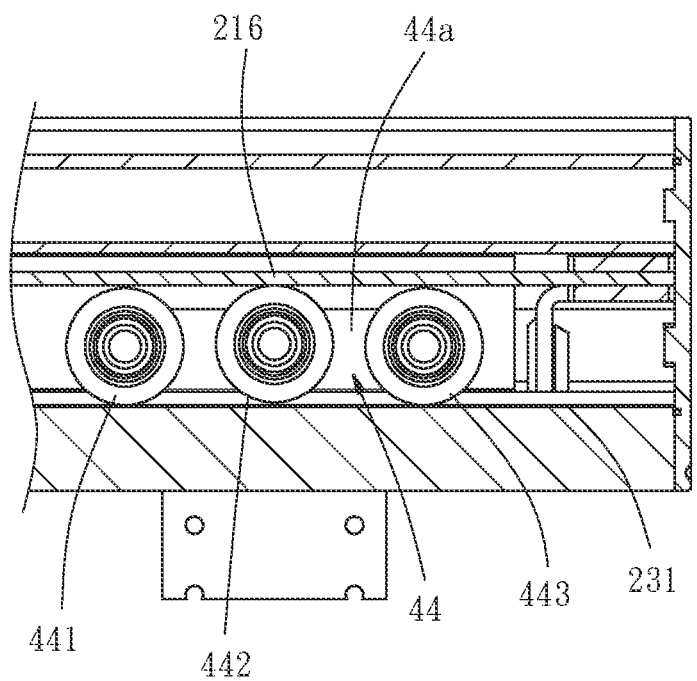
FIG. 6 is a front cross-sectional view of the electric door driving mechanism of the embodiment of the present invention.
Figure 7:
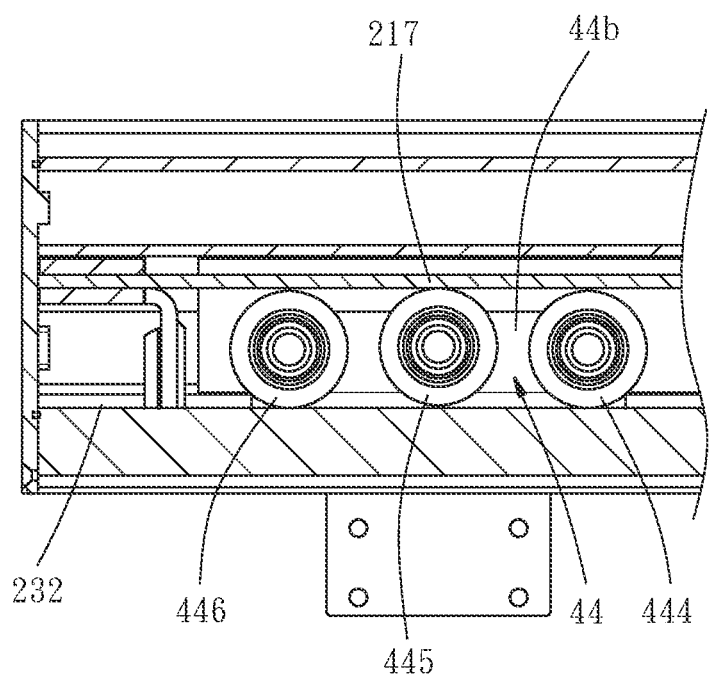
FIG. 7 is a rear cross-sectional view of the electric door driving mechanism of the embodiment of the present invention.

The sliding unit 4 comprises a slide 41, which is slidably disposed within the sliding groove 23 along the longitudinal axis A. The slide 41 has a mover accommodating mount 42, two adjustment blocks 43 (in this embodiment, but not limited to two adjustment blocks for the present invention), and two bottom mounts 44 (in this embodiment, but not limited to two bottom mounts for the present invention). The mover accommodating mount 42 has an adjustment groove 421, a left opening 424, a right opening 425, and a bottom opening 426. The adjustment groove 421 extends along the longitudinal axis A, and the left and right openings 424, 425 are in communication with the left and right ends of the adjustment groove 421. The bottom opening 426 is in communication with the bottom portion of the adjustment groove 421. Additionally, the top surface 421a of the mover accommodating mount 42 has a magnet mounting groove 422. The shape of the adjustment block 43 corresponds to the shape of the adjustment groove 421. The adjustment block 43 is inserted into the adjustment groove 421 through the left opening 424 or the right opening 425 of the mover accommodating mount 42 and slidable moveable along the longitudinal axis A. The bottom mount 44 is located below the mover accommodating mount 42 and corresponds to the adjustment block 43. Referring to FIG. 6, the front side 44a of each bottom mount 44 has a first pulley 441, a second pulley 442 adjacent to the first pulley 441, and a third pulley 443 adjacent to the second pulley 442. Referring to FIG. 7, the rear side 44b of each bottom mount 44 has a first roller 444, a second roller 445 adjacent to the first roller 444, and a third roller 446 adjacent to the second roller 445.

The sliding unit 4 further includes a door panel mounting member 45, which has a body portion 451 and a base board 452 connected to the body portion 451. The door panel mounting member 45 is inserted into the sliding groove 23 from the left opening 27a or right opening 27b of the base mount 21, and is secured to the adjustment blocks 43 by a plurality of bolts 10 (in this embodiment, four bolts 10 are used, but not limited to four bolts for the present invention), which pass from bottom to top through the bottom mounts 44 and the bottom opening 426 of the mover accommodating mount 42. The bolts lock the adjustment blocks 43 in place in the adjustment grooves 421. In this way, the door panel mounting member 45 is fixed to the slide 41, such that the door panel mounting member 45 is slidably moveable along with the slide 41. As to the body portion 451 of the door panel mounting member 45, it extends downward and partially protrudes outside the base mount 21 through the bottom opening 26 adapted for being fixed with a door body 9. This allows the door panel mounting members 45 to drive the door body 9 to open and close during sliding, and by means of adjusting the positions of the adjustment blocks 43 and then fixedly positioning the adjustment blocks 43 in the adjustment groove 421 by the bolts 10, the door panel mounting members 45 can be easily and conveniently associated with various doors of different widths. The adjustment blocks 43 can be tightened and loosened in the adjustment grooves 421 by the bolts 10, thereby achieving the effect of convenient assembly and maintenance. Additionally, as shown in FIGS. 3, 6 and 7, when the slide 41 is installed in the sliding groove 23, the second pulley 442 is abutted against the front partition plate 216 of the base mount 21, while the first pulley 441 and the third pulley 443 are abutted against the protruding rail 231 of the base mount 21. Moreover, the second roller 445 is abutted against the rear partition plate 217 of the base mount 21, while the first roller 444 and the third roller 446 are abutted against the slide rail 232 of the base mount 21. By the abutment arrangement among the pulleys 441, 442, 443 and the rollers 444, 445, 446, up-and-down vibrations of the slide 41 may be dramatically minimized during sliding.

As shown in FIG. 2, the track unit 2 further comprises a left slide stopper 29a and a right slide stopper 29b. The left and right slide stoppers 29a, 29b are inserted into the sliding groove 23 from the left opening 27a or the right opening 27b of the base mount 21 and then fixed in the sliding groove 23 to restrict the sliding position of the slide 41. Specifically, as shown in FIGS. 2 and 3, the left and right slide stoppers 29a, 29b each have an upper mounting plate 291, 292, and a lower mounting plate 293, 294, respectively. Each of the upper mounting plates 291, 292 is slidably disposed on the top surfaces 216a, 217a of the front and rear partition plates 216, 217 of the base mount 21. Each of the lower mounting plates 293, 294 has a horizontal plate portion 293a, 294a, and a vertical plate portion 293b, 294b connected with the horizontal plate portion 293a, 294a, respectively. The horizontal plate portions 293a, 294a are slidably disposed on the bottom surfaces 216b, 217b of the front and rear partition plates 216, 217 of the base mount 21, and respectively fixed to the upper mounting plates 291, 292 by two bolts 10 screwingly threaded into the respective upper mounting plates 291, 292, such that the left and right slide stoppers 29a, 29b are fixedly disposed in the sliding groove 23. Furthermore, the vertical plate portions 293b, 294b each are respectively provided thereon with buffer pads 293c, 294c facing the slide 41 for providing a cushioning effect to the slide 41.

As shown in FIGS. 8 and 9, the linear motor 6 comprises a stator 61 arranged along the longitudinal axis A, and a mover 68 arranged facing the stator 61 along the longitudinal axis A. The stator 61 is installed in the accommodation groove 22 and has a circuit board 62, as well as two electromagnet sets 63, 64 connected with the left and right sides of the circuit board 62. The electromagnet sets 63, 64 each are equipped with a plurality of electromagnetic coils 65, 66. The mover 68 is installed in the magnet mounting groove 422 of the mover accommodating mount 42 and sequentially arranged with a plurality of magnetic attractive members 69, which are realized as, but not limited to, permanent magnets in this embodiment. Specifically, the magnetic attractive members 69 are arranged with different magnetic poles facing the electromagnetic coils 65, 66 of the stator 61. Through the current control of the circuit board 62 of the stator 61, the electromagnetic coils 65, 66 of the electromagnet sets 63, 64 experience changes in magnetic poles, and the magnetic attractive members 69 interact with the electromagnetic coils 65, 66 to generate linear dynamic energy. This results in driving the mover 68 by the stator 61, causing the slide 41 to slidably move in the sliding groove 23. Because the structural relationship and operating principles between the stator 61 and the mover 68 of the linear motor 6 are not the focus of this application and belong to prior arts well known by a person having ordinary skill in the art, detailed descriptions thereof are not necessarily given here.

As shown in FIG. 2, the track unit 2 further includes a left stator stopper 22a and a right stator stopper 22b. The left and right stator stoppers 22a, 22b are inserted into the accommodation groove 22 from the left opening 27a or the right opening 27b of the base mount 21, and secured to the inner wall surface 213a of the top plate 213 of the base mount 21 by two bolts 10 from bottom to top, respectively, such that the left and right stator stoppers 22a, 22b are located at the left and right sides of the stator 61 to limit the fixed position of the stator 61.

Referring to FIGS. 4 and 5, the front and rear water-resistant pieces 7, 8 each have a head portion 71, 81, a neck portion 72, 82 connected with the head portion 71, 81, and a body portion 75, 85 connected with the neck portion 72, 82. Each of the head portions 71, 81 of the front and rear water-resistant pieces 7, 8 is positioned in one of the inner groove portions 218d, 219d of the first and second elongated slots 218a, 219a. Each of the neck portions 72, 82 of the front and rear water-resistant pieces 7, 8 is positioned in one of the outer groove portions 218c, 219c of the first and second elongated slots 218a, 219a. The body portions 75, 85 of the front and rear water-resistant pieces 7, 8 extend over the bottom opening 26 of the base mount 21 and are abutted with each other to close the bottom opening 26. As a result, the front and rear water-resistant pieces 7, 8 are respectively fixedly disposed in the first and second elongated slots 218a, 219a, partially pass through the side openings 218b, 219b, and are abutted with each other to close the bottom opening 26.

The structural features of the electric door driving mechanism 1 provided by the present invention are detailedly described above. The functional effects of the electric door driving mechanism 1 provided by the present invention will be detailedly illustrated hereunder.

In actual operation, as shown in FIG. 8, when the electric door driving mechanism 1 is powered on to initiate the circuit board 62 that is equipped with a sensor (not shown) to detect the opening status of the door, the circuit board 62 controls the changes of the poles of the electromagnetic coils 65, 66 of the electromagnet sets 63, 64. When the poles of the electromagnetic coils 65 are the same as the magnetic poles of the magnetic attractive members 69 of the linear motor 6, a repulsive force is generated due to the effect of same polarity. As shown in FIG. 9, when the poles of the electromagnetic coils 66 in the desired sliding direction are controlled to be different from the magnetic poles of the magnetic attractive members 69, an attractive force is generated due to the effect of opposite polarity. As a result, the magnetic attractive members 69 of the linear motor 6 are pushed at one side by the repulsive force due to the electromagnetic coils 65 of same polarity, and attracted at the other side by the attractive force due to the electromagnetic coils 66 of opposite polarity. By means of changing polarities of the electromagnetic coils 65, 66 sequentially, the slide 41 will smoothly and slidably move in the sliding groove 23 thanks to the assistances of the pulleys 441, 442, 443, and the rollers 444, 445, 446. On the other hand, when the door body 9 slides to one end of the base mount 21 to reach a closed state, the circuit board 62 can confirm whether the door body 9 has been closed based on the states of the magnetic pole changes of the electromagnetic coils 65, 66, thereby achieving the effect of opening and closing the door body 9.

Referring to FIGS. 4 and 5, the front and rear water-resistant pieces 7, 8 each are provided with upper recess portions 73, 83, and lower recess portions 74, 84 corresponding to each other and formed between the head portions 71, 81 and the neck portions 72, 82. The walls of the first and second elongated slots 218a, 219a of the base mount 21 each have an upper protrusion portion 218e, 219e, and a lower protrusion portion 218f, 219f. The upper protrusion portions 218e, 219e and the lower protrusion portions 218f, 219f extend along the longitudinal axis A and are respectively engaged with the upper recess portions 73, 83, and the lower recess portions 74, 84. Moreover, each of the body portions 75, 85 of the front and rear water-resistant pieces 7, 8 has an extension segment 751, 851, a bending portion 752, 852 connecting to the extension segment 751, 851, and an abutment segment 753, 853 connecting to the bending portion 752, 852. Each extension segment 751, 851 extends upwardly and inclinedly, while each abutment segment 753, 853 extends downwardly relative to the extension segment 751, 851 and is abutted against one of the front and rear sides of the body portion 451 of the door panel mounting member 45. This significantly enhances the stability of the front and rear water-resistant pieces 7, 8, making them less prone to detachment due to the sliding movement of the slide 41 and the door panel mounting member 45 within the sliding groove 23.

Furthermore, the neck portions 72 and 82 of the front and rear water-resistant pieces 7 and 8 respectively have tapered surfaces 721 and 821 corresponding to the shapes of the outer groove portions 218c and 219c, such that the tapered surfaces 721 and 821 of the front and rear water-resistant pieces 7 and 8 can be tightly abutted to the tapered wall surfaces 218g and 219g of the first and second elongated slots 218a and 219a. As a result, if any liquid enters the first and second elongated slots 218a and 219a, the sealing design between the tapered surfaces 721 and 821 and the tapered wall surfaces 218g and 219g can prevent the aforesaid liquid from entering the interior of the electric door driving mechanism 1, thus preventing contamination or corrosion. This significantly enhances the sealing effect between the front and rear water-resistant pieces 7 and 8 and the first and second elongated slots 218a and 219a of the base mount 21.

Figure 10:
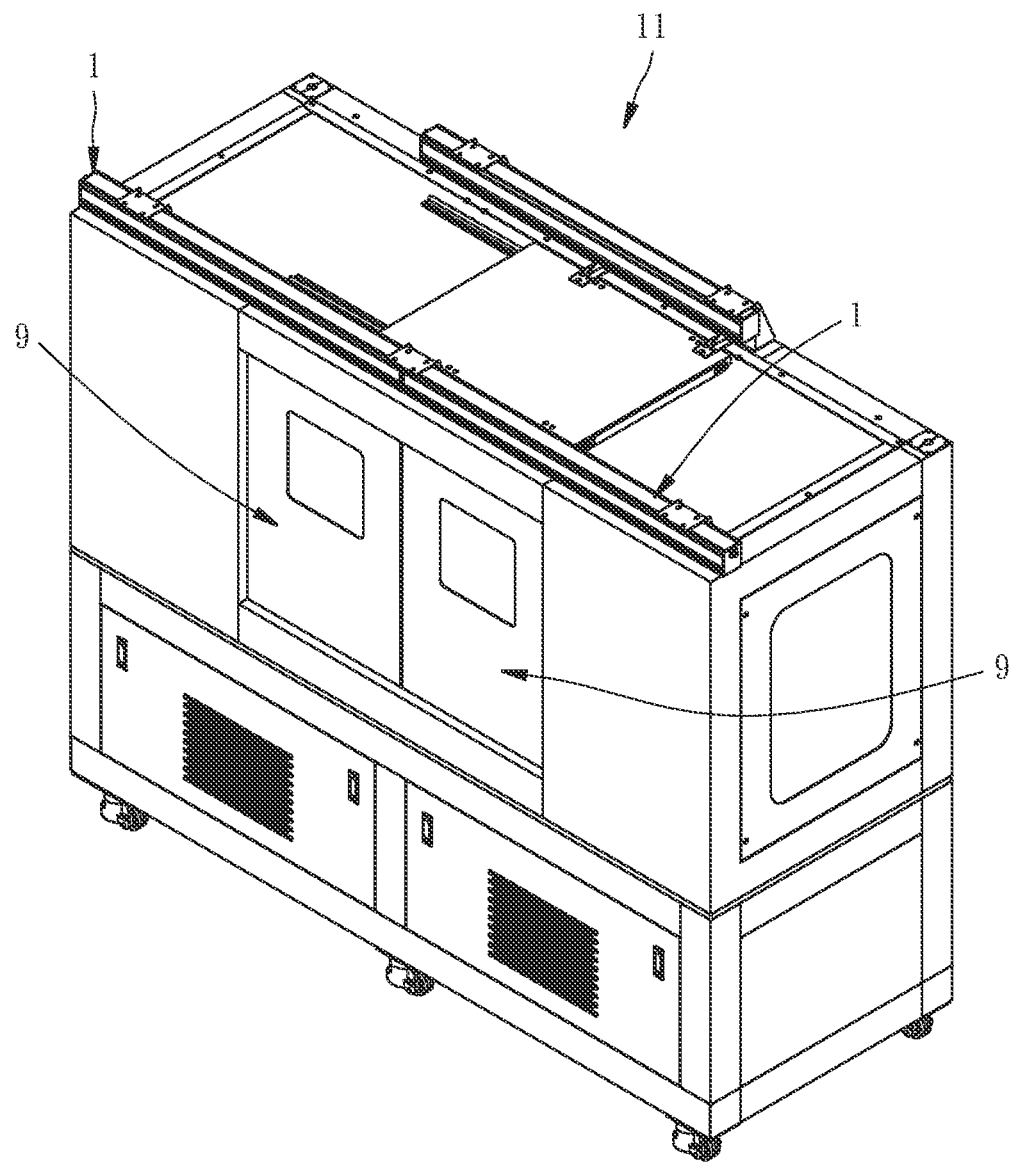
FIG. 10 is a schematic view illustrating that the electric door driving mechanism of the embodiment of the present invention is installed in the machine tool.

FIG. 10 is a schematic view showing a machine tool 11, such as a CNC lathe, equipped with two electric door driving mechanisms 1 of the present invention. When the machine tool 11 is performing machining tasks, the front and rear water-resistant pieces 7, 8 of the electric door driving mechanism 1 will come into contact with each other to close the bottom opening 26, as shown in FIG. 4. This effectively prevents the chips generated during the machining process and the splashing cutting fluid from infiltrating or jamming into the bottom opening 26 of the electric door driving mechanism 1. In addition to achieving the normal opening and closing of the door body 9, this design solves the problem of abnormal noise and vibration in the electric door driving mechanism 1 caused by chip entrapment and rust, thereby extending the service life of the electric door driving mechanism 1.

As mentioned above, the electric door driving mechanism 1 of the present invention controls the electromagnetic coils 65, 66 through the circuit board 62 to generate magnetic pole changes. By utilizing the repulsive and attractive forces generated by the principles of same and opposite magnetic poles, the magnetic attractive members 69 of the sliding unit 4 can experience repulsion and attraction displacements based on the magnetic pole changes of the electromagnetic coils 65, 66 of the electromagnet sets 63, 64, achieving the opening and closing movement of the door body 9. Additionally, the present invention features a sealing design that the front and rear water-resistant pieces 7, 8 are fixed to the front and rear bottom plates 218, 219 of the base mount 21 to seal the bottom opening 26, preventing foreign objects and liquids from splashing into inside of the electric door driving mechanism 1. Furthermore, the structural design of the present invention is simple, allowing for quick and convenient assembly, as well as efficient maintenance and repairs of internal components. This design addresses the drawback of the complicated disassembly and assembly procedures present in prior art.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electric door driving mechanism for a machine tool, the electric door driving mechanism comprising:
a track unit comprising:
a base mount having an accommodation groove extending along a longitudinal axis of the base mount, a sliding groove located below the accommodation groove, a bottom opening in communication with the sliding groove, and left and right openings in communication with the accommodation groove, the sliding groove, and the bottom opening;
a left end cap closing the left opening; and
a right end cap closing the right opening;
a sliding unit comprising:
a slide disposed in the sliding groove in a way that the slide is movable along the longitudinal axis of the base mount; and
a door panel mounting member fixed to the slide, such that the door panel mounting member is moveable along with the slide, the door panel mounting member having a body portion downwardly extending through the bottom opening and being partially exposed outside the base mount;
a linear motor comprising a stator disposed in the accommodation groove and arranged along the longitudinal axis, and a mover disposed on the slide, facing the stator, and arranged along the longitudinal axis, the mover being driven by the stator to drive the slide to slide in the sliding groove; and
front and rear water-resistant pieces respectively fixed to the base mount along the longitudinal axis in a way that the front and rear water-resistant pieces are partially abutted with each other to close the bottom opening while the body portion of the door panel mounting member passes between the front and rear water-resistant pieces in a way that the body portion of the door panel mounting member has front and rear sides abutted against the front and rear water-resistant pieces, respectively-;
wherein the slide comprises a mover accommodating mount and a bottom mount below the mover accommodating mount; the mover of the linear motor is installed on a top portion of the mover accommodating mount; the mover accommodating mount has an adjustment groove extending along the longitudinal axis, an adjustment block slidably disposed in the adjustment groove, and a bottom opening in communication with the adjustment groove; the door panel mounting member is fixed to the adjustment block by a bolt passing through the bottom mount and the bottom opening of the mover accommodating mount and screwing into the adjustment block such that the adjustment block is positioned in the adjustment groove; the bottom mount has a front side provided with a pulley, and the sliding groove has a front side provided with a protruding rail coupled with the pulley.

2. The electric door driving mechanism as described in claim 1, wherein the base mount comprises a front bottom plate and a rear bottom plate, which extend along the longitudinal axis in a way that the bottom opening is formed between the front and rear bottom plates; the front water-resistant piece and the rear water-resistant piece are respectively fixed to the front bottom plate and the rear bottom plate, respectively.

3. The electric door driving mechanism as described in claim 2, wherein the front bottom plate has a first elongated slot extending along the longitudinal axis, and the rear bottom plate has a second elongated slot extending along the longitudinal axis; the first and second elongated slots each have a side opening; the front and rear water-resistant pieces are respectively fixed to the first and second elongated slots in a way that the front and rear water-resistant pieces partially extend through the side openings to abut against each other to close the bottom opening.

4. The electric door driving mechanism as described in claim 3, wherein the first and second elongated slots each have an inner groove portion and an outer groove portion in communication with the inner groove portion and the side opening; the front and rear water-resistant pieces each have a head portion, a neck portion connecting the head portion, and a body portion connecting the neck portion; the head portions of the front and rear water-resistant pieces are respectively positioned in the inner groove portions, the neck portions of the front and rear water-resistant pieces are respectively positioned in the outer groove portions, and the body portions of the front and rear water-resistant pieces extend over the bottom opening and abut against each other to close the bottom opening.

5. The electric door driving mechanism as described in claim 4, wherein the body portion of each of the front and rear water-resistant pieces has an extension segment extending inclinedly and upwardly, a bending portion connecting the extension segment, and an abutment segment connecting the bending portion, extending downwardly relative to the extension segment, and abutting against one of the front and rear sides of the body portion of the door panel mounting member.

6. The electric door driving mechanism as described in claim 4, wherein the front and rear water-resistant pieces each have upper and lower recess portions formed between the head portion and the neck portion, and corresponding to each other; the first and second elongated slots each have upper and lower protrusion portions formed between the outer groove portion and the inner groove portion, corresponding to each other, extending along the longitudinal axis, and respectively engaged in the upper and lower recess portions of one of the front and rear water-resistant pieces.

7. The electric door driving mechanism as described in claim 6, wherein the outer groove portion of each of the first and second elongated slots has a tapered shape gradually expanding from a juncture between the outer and inner groove portions toward the side opening; the neck portion of each of the front and rear water-resistant pieces has a tapered shape complementary with the tapered shape of the outer groove portion.

8. The electric door driving mechanism as described in claim 1, wherein the door panel mounting member comprises a base board connected with the body portion; the door panel mounting member is inserted into the sliding groove from the left opening or the right opening of the base mount and is fixedly mounted to a bottom portion of the slide by the base board.

9. The electric door driving mechanism as described in claim 1, wherein the front side of the bottom mount is provided with a first pulley, a second pulley adjacent to the first pulley, and a third pulley adjacent to the second pulley; the bottom mount has a rear side provided with a first roller, a second roller adjacent to the first roller, and a third roller adjacent to the second roller; the base mount has a front partition plate and a rear partition plate located between the accommodation groove and the sliding groove, extending along the longitudinal axis, and spaced from each other; the sliding groove has a rear side provided with a slide rail opposite to the protruding rail; the second pulley abuts against the front partition plate, while the first and third pulleys abut against the protruding rail; the second roller abuts against the rear partition plate, while the first and third rollers abut against the slide rail.

10. The electric door driving mechanism as described in claim 1, wherein the track unit comprises a left stator stopper and a right stator stopper, which are respectively inserted into the accommodation groove from the left opening or the right opening of the base mount and fixed to an inner wall surface of a top plate of the base mount by a bolt from bottom to top, such that the left stator stopper and the right stator stopper are positioned at left and right sides of the stator to limit a fixed position of the stator.

11. The electric door driving mechanism as described in claim 1, wherein the track unit comprises a left slide stopper and a right slide stopper, which are respectively inserted into the sliding groove from the left opening or the right opening of the base mount and fixed to the sliding groove to limit movement of the slide in the sliding groove.

12. The electric door driving mechanism as described in claim 11, wherein the base mount comprises a front partition plate and a rear partition plate, which are located between the accommodation groove and the sliding groove, extend along the longitudinal axis, and spaced from each other; the left and right slide stoppers each have a lower mounting plate and an upper mounting plate slidably positioned on top surfaces of the front and rear partition plates; each of the lower mounting plates has a horizontal plate portion and a vertical plate portion connected with the horizontal plate portion; each of the horizontal plate portions is slidably positioned on bottom surfaces of the front and rear partition plates and fixed with one of the upper mounting plates by a bolt, such that the left and right slide stoppers are fixedly positioned in the siding groove; each of the vertical plate portions has a buffer pad facing the slide.

* * * * *